United States Patent [19]

Jersey et al.

[11] 4,280,323

[45] Jul. 28, 1981

[54] GAS TURBINE FUEL CONTROL HAVING FUEL VISCOSITY COMPENSATION TO PROVIDE IMPROVED IGNITION RELIABILITY

[75] Inventors: Chester A. Jersey, Wallingford; Roy W. Kiscaden, Morton, both of Pa.

[73] Assignee: Westinghouse Electric Corp., Pittsburgh, Pa.

[21] Appl. No.: 909,421

[22] Filed: May 25, 1978

[51] Int. Cl.³ .............................................. F02C 9/26
[52] U.S. Cl. ........................... 60/39.14 R; 60/39.28 R
[58] Field of Search ....................... 60/39.14 R, 39.28

[56] References Cited

U.S. PATENT DOCUMENTS

| | | | |
|---|---|---|---|
| 2,733,569 | 2/1956 | Trowbridge | 60/39.14 M |
| 2,862,355 | 12/1958 | Davis et al. | 60/39.14 R |
| 3,022,425 | 2/1962 | Rockstead | 60/39.46 P |
| 3,056,259 | 10/1962 | Jubb et al. | 60/39.14 R |
| 3,259,037 | 9/1973 | Kiseaden | 60/39.14 R |
| 3,282,323 | 11/1966 | Katz et al. | 60/39.14 R |
| 3,566,900 | 3/1971 | Black | 60/39.28 R |
| 3,686,859 | 8/1972 | White | 60/39.28 R |
| 3,688,495 | 9/1972 | Fehler et al. | 60/39.28 R |
| 3,913,314 | 10/1975 | Yannone et al. | 60/39.28 R |

*Primary Examiner*—Louis J. Casaregola
*Attorney, Agent, or Firm*—E. F. Possessky

[57] ABSTRACT

An arrangement is provided for resetting the fuel inlet pressure to the throttle valve in response to sensed changes in nozzle fuel pressure to compensate for variations in the fuel viscosity resulting from changes in fuel temperature. The fuel nozzle pressure is automatically maintained at a fixed value during the ignition sequence to assure reliable ignition without overfueling throughout the range of site ambient temperature variation.

2 Claims, 2 Drawing Figures

GAS TURBINE FUEL CONTROL HAVING FUEL VISCOSITY COMPENSATION TO PROVIDE IMPROVED IGNITION RELIABILITY

BACKGROUND OF THE INVENTION

The present invention relates to power plant gas turbine controls and more particularly to controls in which improved ignition reliability is achieved with fuel viscosity variations caused by ambient temperature variations.

In recent years, gas turbines have been designed for increasingly higher loading which requires higher fuel flows. Since a limit exists on the pressure to which fuel can be pumped, fixed orifice nozzles have been made larger to accommodate the higher fuel flows required at higher loads.

Gas turbine availability for power generation depends directly on ignition reliability and in turn it has been suffering in recent years as a result of the effect of variable fuel viscosity in turbines requiring increasingly larger fuel nozzle orifices. Successful ignition requires fuel flow or pressure to be scheduled fairly accurately, and the effect of fuel viscosity on fuel flow has become much more critical with the larger fuel nozzles. In addition, gas turbine life has been foreshortened by over temperatures caused by overfueling a lower viscosity fuel through the larger nozzles during ignition.

SUMMARY OF THE INVENTION

An improved fuel control provides improved ignition reliability in a gas turbine having substantially fixed orifice nozzles. It comprises means for controlling the position of a throttle valve which regulates the fuel flow to the turbine and a fuel pump which is operative to supply fuel to the throttle valve at an elevated pump discharging pressure. A bypass valve diverts fuel from the throttle valve. Means are provided for generating a signal representative of actual nozzle fuel pressure at least during the ignition period and for generating a pump discharge pressure reference as a function of a nozzle pressure reference and the actual nozzle fuel pressure during ignition. A control output is generated for the bypass valve during ignition in response to the actual pump discharge pressure and the pump discharge pressure reference substantially to hold the nozzle fuel pressure at the desired value even over relatively wide ambient temperature changes.

DESCRIPTION OF THE PREFERRED EMBODIMENT

Figure 1:
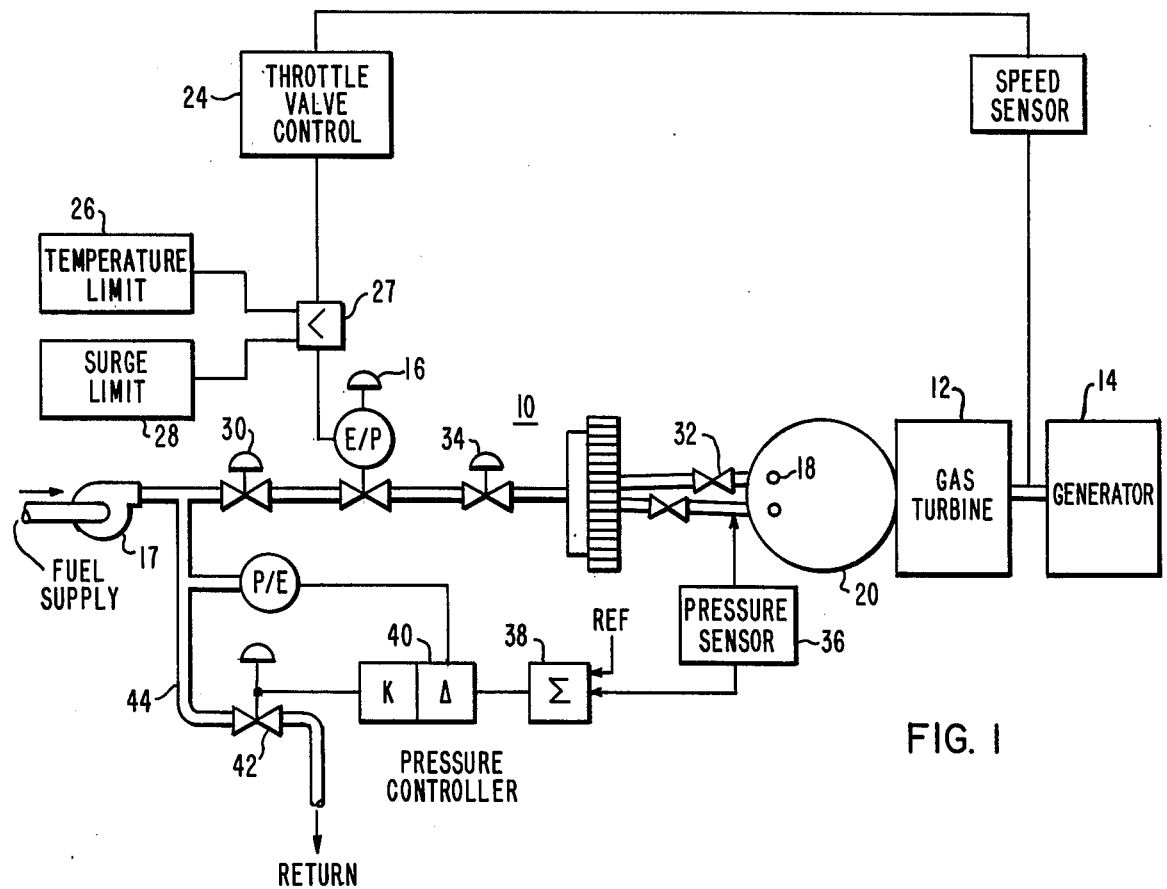
FIG. 1 shows a block diagram of a viscosity compensation fuel control for a gas turbine in accordance with the principles of the invention.

More particularly, there is shown in FIG. 1 a fuel control 10 for a gas turbine 12 which drives an electric generator 14. A throttle valve 16 is positioned by an electropneumatic actuator to control the fuel flow supplied by a pump 17 from a supply to fuel nozzles 18 (not all shown) in a combustor shell 20. A fuel flow divider 22 separates the total fuel flow into individual flow paths to the fuel nozzles.

A throttle valve control 24 operates the throttle valve 16 to schedule fuel for ignition and acceleration of the turbine during startup. After synchronism, a temperature limit control 26 operates through a low signal selector 27 to operate the turbine at the maximum load, or a megawatt control (not shown) may be provided to control turbine load with temperature limit control operative as a backup protection control. A surge limit control 28 may become operative through the low selector 27 to limit turbine acceleration or loading so as to avoid surge conditions.

A valve 30 is provided to trip the turbine on overspeed. Check valves 32 and an isolation valve 34 are also provided in the fuel supply system.

The simplicity of fixed orifice nozzles makes their use desirable in gas turbine operation to handle a large range of fuel flows such as from ignition to maximum load. However, it is desirable to operate the fuel supply with the fixed nozzle orifices so as to avoid overfueling and consequently turbine over temperature operation. Such control is accomplished by controlling the pressure at which fuel flows through a fixed aperture enroute to the nozzle for ignition purposes. The aperture also serves as a minimum fuel setting to maintain combustor fire when the generator load is dumped causing the throttle valve to reposition and reduce fuel flow.

The fuel nozzle is located downstream of the fixed aperture and the system has other restricting devices that the fuel must pass before reaching the nozzle. The nozzle pressure drop, which is a measure of fuel flow, is also a function of fuel viscosity. During cold weather operation, with relatively cold fuel, nozzle pressures tend to decline from the optimum setting. The decline in nozzle pressure is the result of the more viscous fuel losing energy overcoming the various resistances in the piping system. The net result is a lower delivery pressure at the nozzle and a reduced flow rate and greater chances of no ignition.

Heretofore, it has been necessary manually to reset the aperture to compensate for significant temperature changes in fuel with corresponding changes in viscosity. This has been necessary to maintain proper ignition fuel flows at the combustor.

When the aperture is set during warm weather conditions, the unit normally does not have sufficient fuel to ignite during cold weather. Conversely, if the aperture is set during cold weather, the turbine is overfueled and damaged during warmer weather when fuel is less viscous.

In accordance with the present invention, the desired fixed aperture feature is retained, yet the ignition difficulties resulting from variable viscous fuel are overcome substantially by maintaining desired pressure at the nozzle. Generally, by employing a pressure sensor at the nozzle and utilizing an integrated feed back signal to a fuel pump discharge pressure regulator, necessary nozzle pressure adjustment is provided automatically for reliable ignition with changes in ambient temperature.

Figure 2:
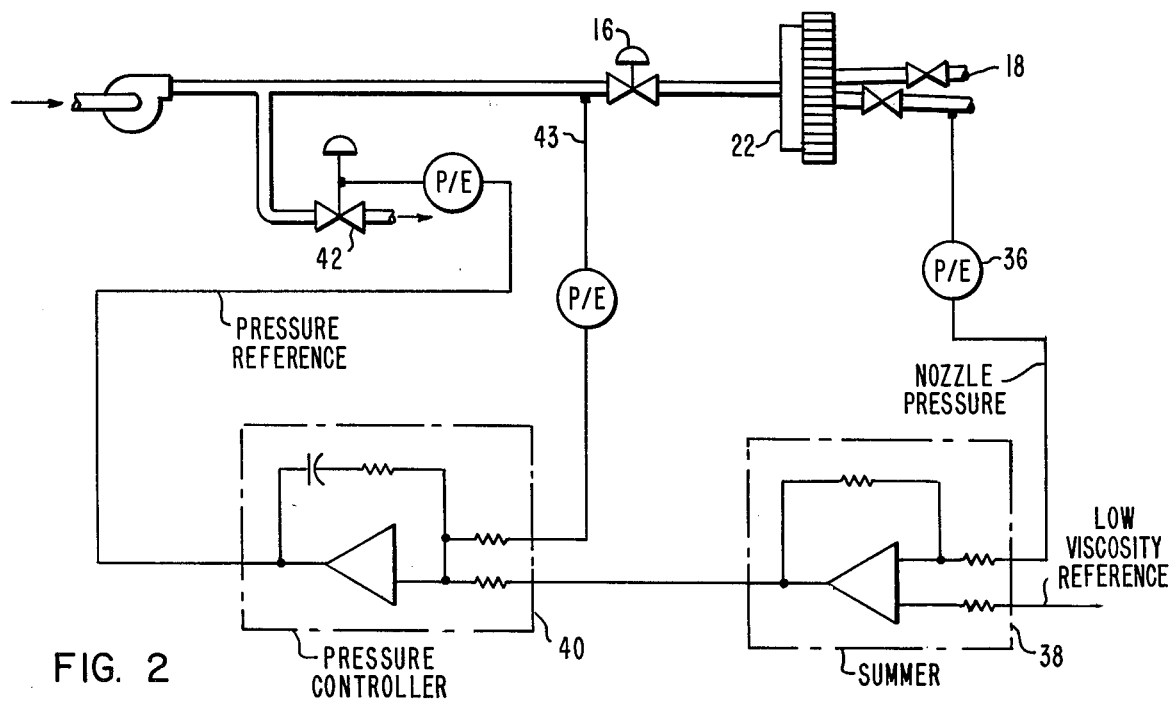
FIG. 2 illustrates some portions of the control in FIG. 1 in greater detail.

As shown in FIGS. 1 and 2, a nozzle pressure sensor 36 associated with one of the fuel nozzles generates during ignition a feedback pressure signal which is summed in summer 38 (see FIGS. 1 and 2) with a reference pressure signal preferably representative of the lowest viscosity fuel expected in turbine use. Fuel having a viscosity higher than the reference low viscosity results in lower nozzle pressure and a higher feedback signal. The output signal from the summer 38 thus becomes a compensated reference to a pressure controller 40 (see FIGS. 1 and 2) which operates a bypass valve 42 in fuel bypass line 44 in response to the difference between the compensated reference and a feedback pump discharge pressure signal 43. With low nozzle fuel pressure caused by higher viscosity fuel, the increased reference signal from the summer 38 causes the pressure controller 40 to produce reduced bypass fuel flow and greater pump discharge pressure and nozzle pressure.

Through the described closed loop control of pump discharge pressure, high ignition probability is achieved even with varying fuel viscosity under varying ambient conditions. Nozzle pressure higher than that normally associated with the lowest expected viscosity fuel can occur as a result of a dirty nozzle, and in this case a flow divider functions to overcome the effects of dirty nozzles. The viscosity control preferably operates only in response to pressures below the reference nozzle pressure and does not respond to fuel nozzle pressures above the reference nozzle pressure.

After ignition, fuel viscosity variations generally have reduced impact on turbine operations, and other turbine limit controls provide compensation and/or protection against effects of fuel viscosity variation. For example, an acceleration limit control would protect against excessive acceleration during startup with a low viscosity fuel. During loading operation, the megawatt controller, is provided, positions the throttle valve to supply the fuel needed for the desired MW load with fuel viscosity variations.

What is claimed is:

1. A fuel control for improving ignition reliability in a gas turbine having substantially fixed orifice nozzles comprising means for controlling the position of a throttle valve which varies the fuel flow to the turbine to control turbine speed or load over a relatively wide range, a fuel pump operative to supply fuel to the throttle valve at an elevated pump discharging pressure, a bypass valve for diverting fuel from the throttle valve, means located proximate to said nozzles and downstream from all valves in the fuel flow path for generating a signal representative of actual nozzle fuel pressure at least during the ignition period, means for generating a pump discharge pressure reference as a function of a nozzle pressure reference and the actual nozzle fuel pressure during ignition and means for generating a control output for said bypass valve during ignition in response to the actual pump discharge pressure and the pump discharge pressure reference substantially to hold the nozzle fuel pressure at the desired value even over relatively wide ambient temperature changes and corresponding fuel viscosity variations.

2. A fuel control as set forth in claim 1 wherein said pressure reference generating means includes a summer responsive to a desired pressure reference signal representative of the lowest fuel viscosity expected in turbine use and to actual nozzle pressure signals representing nozzle pressures below the nozzle pressure associated with the lowest expected viscosity fuel.

* * * * *